United States Patent
Yang

(10) Patent No.: US 7,324,428 B1
(45) Date of Patent: Jan. 29, 2008

(54) FRAME IDENTIFIER

(75) Inventor: Haiyun Yang, San Jose, CA (US)

(73) Assignee: Legend Silicon Corporation, Fremont, CA (US)

( * ) Notice: Subject to any disclaimer, the term of this patent is extended or adjusted under 35 U.S.C. 154(b) by 1197 days.

(21) Appl. No.: 10/040,185

(22) Filed: Oct. 19, 2001

(51) Int. Cl.
- *H04J 11/00* (2006.01)
- *H04J 3/14* (2006.01)
- *H04L 12/28* (2006.01)

(52) U.S. Cl. .................. 370/203; 370/394; 370/252
(58) Field of Classification Search .............. None
See application file for complete search history.

(56) References Cited

U.S. PATENT DOCUMENTS 5,444,697 A * 8/1995 Leung et al. ............... 370/207
6,151,295 A * 11/2000 Ma et al. .................... 370/203
6,671,284 B1 * 12/2003 Yonge et al. ............... 370/462

* cited by examiner

*Primary Examiner*—Steven Nguyen
(74) *Attorney, Agent, or Firm*—Carmen C. Cook; Patent Law Group LLP

(57) ABSTRACT

Method and system for determining the number of one or more of a sequence of M+1 consecutive OFDM frames from analysis of the designated preambles of two or more consecutive frames (m=0, 1, . . . , M; M≧1). An overlap function OF(m;k) is formed for each frame with a sequence of selected reference signals indexed by k (k=1, 2, . . . , K), dependent upon the frame number m and the index k, and a phase (sequence location corresponding to largest amplitude of overlap function) is determined. An Mth-order phase difference is computed that corresponds to frame number of one of the M+1 frames. A consistency check is provided for the phase numbers.

8 Claims, 2 Drawing Sheets

US 7,324,428 B1

FRAME IDENTIFIER

FIELD OF THE INVENTION

This invention relates to discrimination between different communication signal frames, using pseudo-noise signals to determine which frame is present.

BACKGROUND OF THE INVENTION

In certain communication systems that rely upon use of pseudo-noise techniques for signal discrimination, signals are transmitted within each of a sequence of frames, with each frame including a pseudo-noise preamble or post-amble section of a selected length L1 (expressed in bits or symbols) and a data section of length L2. Where the length L1 of the pseudo-noise preamble is greater than the number N1 of distinguishable pseudo-noise signals (each of original length N1), these pseudo-noise signals must be extended to a length L1, in some manner, in order to fill in the remaining bit or symbol spaces.

What is needed in an approach that provides an identification of frame number using a computable value associated with a pseudo-noise signal associated with a preamble (or post-amble) of the frame. Preferably, this approach should provide a unique correspondence between a computable value and a frame id.

SUMMARY OF THE INVENTION

These needs are met by the invention, which provides a method and system for determining which frame is present by: (1) receiving two or more consecutive frames and computing overlap functions, OF(m;1) and OF(m;2) (e.g., correlation functions), for each of the frame preambles or post-ambles with a reference signal, where m is an offset index or integer; (2) determining the location ("phase") of the maximum amplitude of OF(m;k) (k=1, 2) as the index m is varied; (3) forming a pth-order difference of the phases (p≧1); and (4) using the pth-order phase difference to determine a (unique) frame number that corresponds to the pth-order difference. The pth order difference can be defined in several ways to provide a unique correspondence with frame number.

DESCRIPTION OF BEST MODES OF THE INVENTION

Figure 1:
FIG. 1 illustrates a sequence of N1 consecutive frames used in the invention
Figure 2:
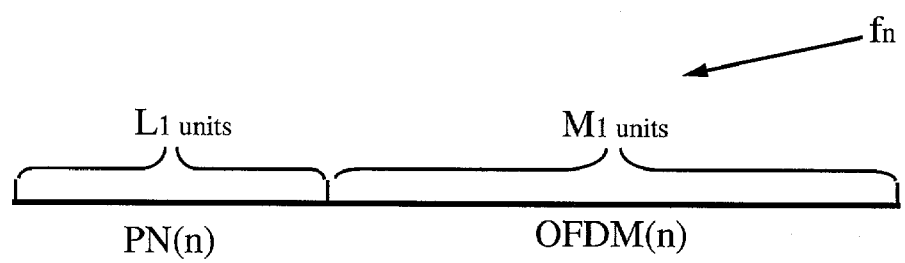
FIG. 2 illustrates two major components of a frame, with component lengths L1, and M1, processed by the invention.

A communication signal, as received and analyzed according to the invention, includes a sequence of N1 consecutive frames $f_n$, numbered n=0, 1, 2, ..., N1-2, N1-1, with frame numbers being repeated periodically where required, as shown in FIG. 1. Each frame $f_n$ includes a pseudo-noise preamble or post-amble PN(t;n) (referred to collectively as a "designated pre-amble" herein) of length N1 bits or symbols ("units"), followed by or preceded by an OFDM sequence OFDM(t;n) that includes data that are being transmitted, as illustrated in FIG. 2. In one embodiment of the invention, discussed here as an example, N1=253, N1' (=min value ≧N1 of form 2P1)=255, L1=378 and M1=3780.

In one embodiment of the invention, each pseudo-noise preamble PN(t;n) consists of a sequence of values (+1 or −1) and is optionally a time shifted replica of any other pseudo-noise preamble PN(t;n') in the ensemble of pseudo-noise signals of length N1; each augmented preamble is periodic;

$$PN(t;n)=PN(t+\Delta t(n;m);m), \quad (1)$$

Figure 3:
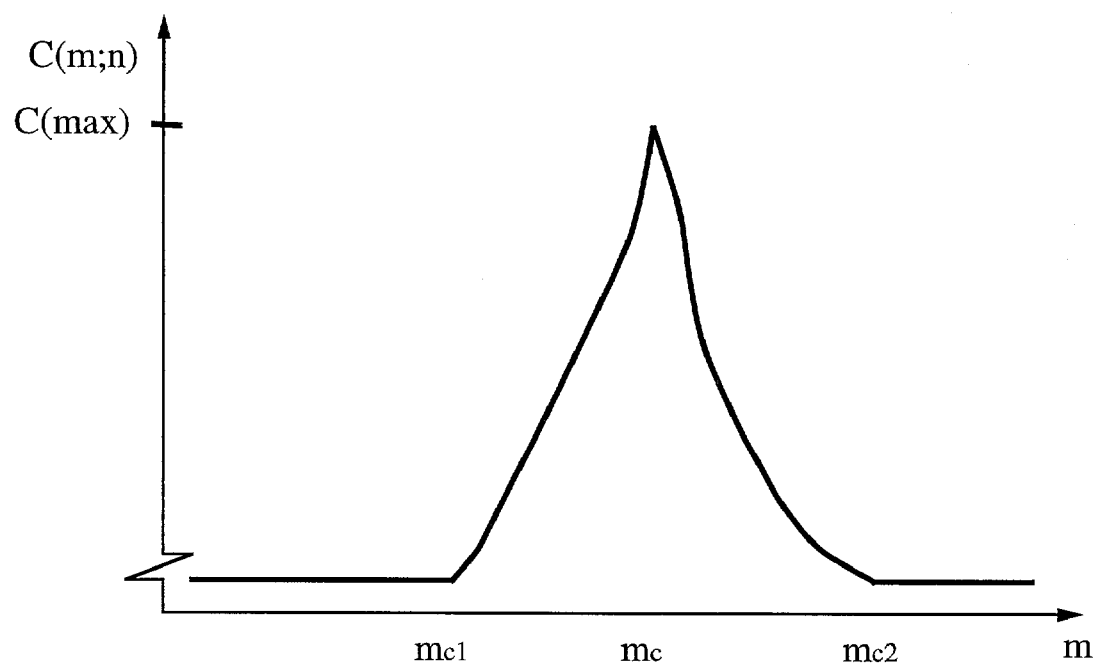
FIG. 3 is a graphical view of an correlation or overlap function computed from a basic pseudo-noise signal used in the invention.

Here the time shift value $\Delta t(n;m)$ is a selected number of units that may depend upon the indices m and n. More generally, PN(t;n) need not be a time-shifted replica of PN(t;m), and the relationship is more complex. An overlap function, such as a correlation function, $$C(n;m)=\int PN(t;n) \, PN(t;n+m)dt \quad (m=0, \pm 1, \pm 2, \ldots), \quad (2)$$

computed over a selected interval for any pair of pseudo-noise signals, PN(t;n) and P(t;n+m), behaves approximately as illustrated in FIG. 3: (1) small negative (or positive values) of C(n,m), except within a small band of indices m given by $m_{c1} \leq m \leq m_{c2}$; (2) C(n,m) rising monotonically, but not necessarily linearly, to a sharply defined peak as m increases to a central value, $m \rightarrow m_c$; (3) C(n,m) decreasing monotonically, but not necessarily linearly, to small negative (or positive) values as m increases, beyond $m_c$, with $m \rightarrow m_{c2}$, with $m_{c1} > m_c > m_{c2}$. Optionally, the correlation function C(n;m) is periodic in the index m, with period equal to N1 or related to N1.

Figure 4A:
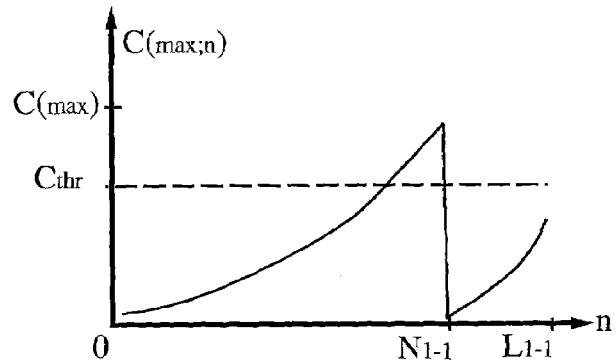
FIGS. 4A, 4B and 4C are graphical views of correlation function maxima computed using different index values.
Figure 4B:
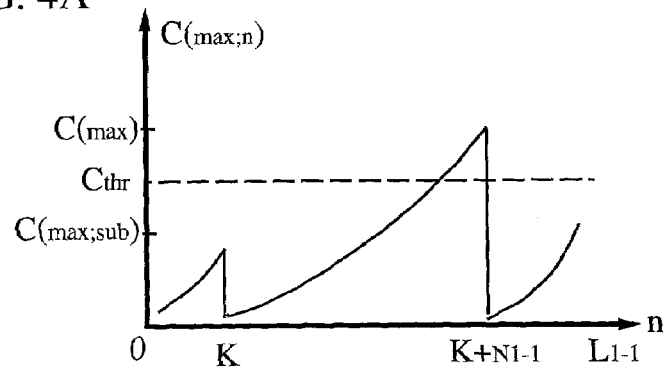
Figure 4C:
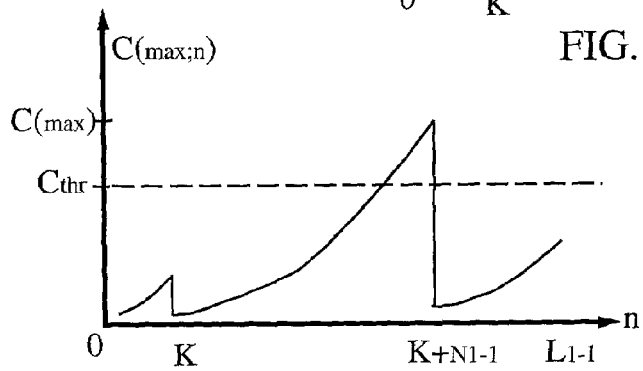

Because the number N1 (and thus length) of a PN signal used is less than the length L1 of the designated preamble, the quantity C(n;m) will have a main peak of amplitude C(max) and one or two subsidiary peaks of lesser amplitude, as indicated in FIGS. 4A, 4B and 4C. Except for effects of the presence of noise, one peak will always have an amplitude equal to C(max) and each of the other (subsidiary) peaks will have a reduced amplitude, no larger than C(max; sub) (<C(max)).

When two or more consecutive frames as received, the designated preamble PRE(t;m) for each frame is used to compute overlap functions $$OF(m;k)=\int PRE(t;m) \, MS(t;k) \, dt \quad (k=1, 2, \ldots, N1') \quad (3)$$

over a discrete range, such as $-[(N1)/2]_{int} \leq m \leq [(N1+1)/2]_{int}$, over a corresponding continuous range, or over a selected sub-range for the N1 designated preamble signals, where MS(t;k) is a known m-sequence signal and k=1, ..., N1 is an index that may represent a shift or translation of a single m-sequence, or {MS(t;k)} may be a collection of different m-sequences. If each of the designated preamble signals PRE(t;m) is a PN signal, each of the overlap functions will behave as illustrated in FIG. 3, as a function of the unknown frame index m, and each overlap function OF(m;k) will have a maximum peak value and a corresponding peak value location or phase, $m=m_c(k)$.

Figure 5:
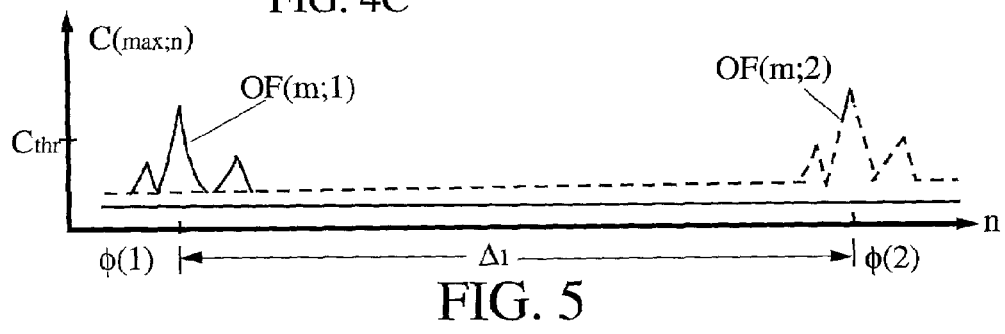
FIG. 5 graphically illustrates how overlap functions for two consecutive frame preambles would appear.

FIG. 5 graphically illustrates how the overlap functions OF(m;k) would appear in a preferred embodiment in which the correlation function in FIG. 3 is linear in the region $m_{c1} \leq m_{c2}$ for each such function. Each overlap function will manifest a main peak, of height approximately equal to C(max), and one or two subsidiary peaks or lesser amplitude with maximum peak value(s) C(max;sub)<C(max). Ideally, the main peak will have the value C(max), except for the presence of noise, where the main peak may have a reduced value, at least equal to C(max;red), with C(max;sub)<C(max;red)<C(max). Optionally, the system applies a threshold criterion and determines only the location of any main peak whose amplitude C(peak) satisfies $$C(peak) > C_{thr} = w \cdot C(max;sub) + (1-w) \cdot C(max;red), \quad (4)$$

where w is a selected real number satisfying $0 \leq w \leq 1$. This optional approach again ensures that only the maximum peak amplitude, and its corresponding phase, will be identified.

Each of the locations, $m=m_c(1)$ and $m=m_c(2)$, of the maximum peaks for the overlap functions, OF(m;k) and OF(m+1;k), of two or more consecutive frames has an associated phase $\phi(m)$, an integer or other index that ranges from $-63++63$ and generally has two different frames (e.g., nos 51 and 201, each with phase $\phi(m)=-26$) that correspond to the same phase. Table 1 sets forth phases and phase differences associated with each of the 253 frames. Thus, an individual phase $\phi(m)$ cannot be used as a unique identifier for the unknown frame number m. However, a first-order phase difference $$\Delta_1(m) = \phi(m+1) - \phi(m) \quad (5)$$

also set forth in Table 1, varies from 0 to +126 and from −1 to −126 and is unique, if not monotonic, for each of the 253 frames.

Thus, $\Delta_1(m)$ can be computed and compared against a table or data base to determine the frame number m. If $\Delta_1(m)$ is negative, the frame number is odd (e.g., 1, 3, 5, . . . , 251); and if $\Delta_1(m)$ is positive, the frame number is even. The frame number itself can be determined from the following:

$1 \leq \Delta_1(m) \leq 126$ and even: $m=\Delta_1(m)$;

$1 \leq \Delta_1(m) \leq 125$ and odd: $m=253-\Delta_1(m)$;

$-126 \leq \Delta_1(m) \leq -2$ and even: $m=253+\Delta_1(m)$;

$-125 \leq \Delta_1(m) \leq -1$ and odd: $m=-\Delta_1(m)$. (6)

Equation (6( can be expressed here as an inverse mapping $m=F\{\Delta_1(m)\}$.

From Table 1, one verifies that the first-order phase sums satisfy $$\Sigma_1(m) = \phi(m+1) = \pm 1, \quad (7)$$

and the values +1 and −1 should alternate as m increases. These constraints can be used to check for consistency in the phases $\phi(m)$, where $\phi(m)$ is allowed to have integer and non-integer values. For example, the peaks of three consecutive overlap functions, OF(m;k) and OF(m+1;k) and OF(m+2;k) (k=unknown frame no. =1, 2, . . . ), may appear to occur at non-integer values m=m' and m=m" and m=m''', such as $\phi(m)=6.9$ and $\phi(m'')=-7.4$ and $\phi(m''')=8.7$. As a first approach, one might re-assign the indices to nearest-integer values, $\phi(m') \rightarrow 7$, $\phi(m'') \rightarrow -7$ and $\phi(m''') \rightarrow 9$. However, the sums become $$\Sigma_1(m) = \phi(m') + \phi(m'') = 0, \quad (8A)$$

$$\Sigma_1(m) = \phi(m'') + \phi(m''') = +2, \quad (8B)$$

each of which is clearly inconsistent with the constraints set forth in Eq. (10). One method of avoiding these inconsistencies is to (re)assign $\phi(m'')=-8$, whereby the sums become $$\Sigma_1(m) = \phi(m') + \phi(m'') = -1, \quad (9A)$$

$$\Sigma_1(m) = \phi(m'') + \phi(m''') = +1, \quad (9B)$$

which is consistent with Eq. (10). If each of two consecutive sums, $\Sigma_1(m)$ and $\Sigma_1(m+1)$, does not satisfy the constraint in Eq. (7), adjustment of the reassigned phase value $\phi(m+1)$ may satisfy each of the corresponding constraints.

Other phase differences $\Delta_p(m)$ may or may not provide a unique correspondence with frame number. For example, the second-order phase different $$\Delta_2(m) = \Delta_1(m+1) - \Delta_1(m) \quad (10)$$
$$= \phi(m+2) - 2\phi(m+1) + \phi(m)$$

does not provide a unique correspondence because, for example $$\Delta_2(m=124) = \Delta_2(m=126) = 251. \quad (11)$$

This is also true for the fourth-order phase difference $$\Delta_4(m) = \phi(m+4) - 4\phi(m+3) + 6\phi(m+2) + 4\phi(m+1) + \phi(m), \quad (12)$$

where, for example, $$\Delta_4(m=122) = \Delta_4(m=126) = -988. \quad (13)$$

However, the third order phase difference, defined by $$\Delta_3(m) = \phi(m+3) - 3\phi(m+2) + 3\phi(m+1) - \phi(m), \quad (14)$$

does provide a unique correspondence with frame number m. It is postulated here that a Qth-order phase difference $(Q \geq 2)$, defined as $$\Delta_Q(m) = \sum_{q=0}^{Q} (-)^q \{Q!/(Q-q)!q!\} \phi(m+q). \quad (15)$$

does provide a unique correspondence with frame number (only) for odd integers Q. More generally, a suitably weighted linear combination, such as $$LC(m) = \Delta_1(m) \pm 0.5 \cdot \Delta_2(m) \pm 0.25 \cdot \Delta_3(m) \pm 0.125 \cdot \Delta_4(m) \quad (16)$$

can provide a unique correspondence, because the pair of indices at which $\Delta_2(m)$ is not unique and the pair of indices at which $\Delta_4(m)$ is not unique, do not coincide. More generally, a linear combination such as $$LC(m) = \sum_{p=1}^{P} c(p) \Delta_p(m) \; (P \geq 2) \quad (17)$$

may provide a unique correspondence, where at least one coefficient c(p) is non-zero. In particular, a linear combination LC(m) for which $$c(1)=1, \quad (18A)$$

$$c(p+1)/c(p) \leq 0.5 \; (p=1, \ldots, P-1), \quad (18B)$$

provides a unique correspondence.

TABLE 1

Frame Numbers; Phases; Phase Differences

| Frame No. | φ(m) | Δ₁(m) | Δ₂(m) | Δ₃(m) | Δ₄(m) |
|---|---|---|---|---|---|
| 0 | 0 | 0 | −1 | 4 | −12 |
| 1 | −1 | −1 | 3 | −8 | 20 |
| 2 | 1 | 2 | −5 | 12 | −28 |
| 3 | −2 | −3 | 7 | −16 | 36 |
| 4 | 2 | 4 | −9 | 20 | −44 |
| 5 | −3 | −5 | 11 | −24 | 52 |
| 6 | 3 | 6 | −13 | 28 | −60 |
| 7 | −4 | −7 | 15 | −32 | 68 |
| 8 | 4 | 8 | −17 | 36 | −76 |
| 9 | −5 | −9 | 19 | −40 | 84 |
| 10 | 5 | 10 | −21 | 44 | −92 |
| 11 | −6 | −11 | 23 | −48 | 100 |
| 12 | 6 | 12 | −25 | 52 | −108 |
| 13 | −7 | −13 | 27 | −56 | 116 |
| 14 | 7 | 14 | −29 | 60 | −124 |
| 15 | −8 | −15 | 31 | −64 | 132 |
| 16 | 8 | 16 | −33 | 68 | −140 |
| 17 | −9 | −17 | 35 | −72 | 148 |
| 18 | 9 | 18 | −37 | 76 | −156 |
| 19 | −10 | −19 | 39 | −80 | 164 |
| 20 | 10 | 20 | −41 | 84 | −172 |
| 21 | −11 | −21 | 43 | −88 | 180 |
| 22 | 11 | 22 | −45 | 92 | −188 |
| 23 | −12 | −23 | 47 | −96 | 196 |
| 24 | 12 | 24 | −49 | 100 | −204 |
| 25 | −13 | −25 | 51 | −104 | 212 |
| 26 | 13 | 26 | −53 | 108 | −220 |
| 27 | −14 | −27 | 55 | −112 | 228 |
| 28 | 14 | 28 | −57 | 116 | −236 |
| 29 | −15 | −29 | 59 | −120 | 244 |
| 30 | 15 | 30 | −61 | 124 | −252 |
| 31 | −16 | −31 | 63 | −128 | 260 |
| 32 | 16 | 32 | −65 | 132 | −268 |
| 33 | −17 | −33 | 67 | −136 | 276 |
| 34 | 17 | 34 | −69 | 140 | −284 |
| 35 | −18 | −35 | 71 | −144 | 292 |
| 36 | 18 | 36 | −73 | 148 | −300 |
| 37 | −19 | −37 | 75 | −152 | 308 |
| 38 | 19 | 38 | −77 | 156 | −316 |
| 39 | −20 | −39 | 79 | −160 | 324 |
| 40 | 20 | 40 | −81 | 164 | −332 |
| 41 | −21 | −41 | 83 | −168 | 340 |
| 42 | 21 | 42 | −85 | 172 | −348 |
| 43 | −22 | −43 | 87 | −176 | 356 |
| 44 | 22 | 44 | −89 | 180 | −364 |
| 45 | −23 | −45 | 91 | −184 | 372 |
| 46 | 23 | 46 | −93 | 188 | −380 |
| 47 | −24 | −47 | 95 | −192 | 388 |
| 48 | 24 | 48 | −97 | 196 | −396 |
| 49 | −25 | −49 | 99 | −200 | 404 |
| 50 | 25 | 50 | −101 | 204 | −412 |
| 51 | −26 | −51 | 103 | −208 | 420 |
| 52 | 26 | 52 | −105 | 212 | −428 |
| 53 | −27 | −53 | 107 | −216 | 436 |
| 54 | 27 | 54 | −109 | 220 | −444 |
| 55 | −28 | −55 | 111 | −224 | 452 |
| 56 | 28 | 56 | −113 | 228 | −460 |
| 57 | −29 | −57 | 115 | −232 | 468 |
| 58 | 29 | 58 | −117 | 236 | −476 |
| 59 | −30 | −59 | 119 | −240 | 484 |
| 60 | 30 | 60 | −121 | 244 | −492 |
| 61 | −31 | −61 | 123 | −248 | 500 |
| 62 | 31 | 62 | −125 | 252 | −508 |
| 63 | −32 | −63 | 127 | −256 | 516 |
| 64 | 32 | 64 | −129 | 260 | −524 |
| 65 | −33 | −65 | 131 | −264 | 532 |
| 66 | 33 | 66 | −133 | 268 | −540 |
| 67 | −34 | −67 | 135 | −272 | 548 |
| 68 | 34 | 68 | −137 | 276 | −556 |
| 69 | −35 | −69 | 139 | −280 | 564 |
| 70 | 35 | 70 | −141 | 284 | −572 |
| 71 | −36 | −71 | 143 | −288 | 580 |
| 72 | 36 | 72 | −145 | 292 | −588 |
| 73 | −37 | −73 | 147 | −296 | 596 |
| 74 | 37 | 74 | −149 | 300 | −604 |

TABLE 1-continued

Frame Numbers; Phases; Phase Differences

| Frame No. | φ(m) | Δ₁(m) | Δ₂(m) | Δ₃(m) | Δ₄(m) |
|---|---|---|---|---|---|
| 75 | −38 | −75 | 151 | −304 | 612 |
| 76 | 38 | 76 | −153 | 308 | −620 |
| 77 | −39 | −77 | 155 | −312 | 628 |
| 78 | 39 | 78 | −157 | 316 | −636 |
| 79 | −40 | −79 | 159 | −320 | 644 |
| 80 | 40 | 80 | −161 | 324 | −652 |
| 81 | −41 | −81 | 163 | −328 | 660 |
| 82 | 41 | 82 | −165 | 332 | −668 |
| 83 | −42 | −83 | 167 | −336 | 676 |
| 84 | 42 | 84 | −169 | 340 | −684 |
| 85 | −43 | −85 | 171 | −344 | 692 |
| 86 | 43 | 86 | −173 | 348 | −700 |
| 87 | −44 | −87 | 175 | −352 | 708 |
| 88 | 44 | 88 | −177 | 356 | −716 |
| 89 | −45 | −89 | 179 | −360 | 724 |
| 90 | 45 | 90 | −181 | 364 | −732 |
| 91 | −46 | −91 | 183 | −368 | 740 |
| 92 | 46 | 92 | −185 | 372 | −748 |
| 93 | −47 | −93 | 187 | −376 | 756 |
| 94 | 47 | 94 | −189 | 380 | −764 |
| 95 | −48 | −95 | 191 | −384 | 772 |
| 96 | 48 | 96 | −193 | 388 | −780 |
| 97 | −49 | −97 | 195 | −392 | 788 |
| 98 | 49 | 98 | −197 | 396 | −796 |
| 99 | −50 | −99 | 199 | −400 | 804 |
| 100 | 50 | 100 | −201 | 404 | −812 |
| 101 | −51 | −101 | 203 | −408 | 820 |
| 102 | 51 | 102 | −205 | 412 | −828 |
| 103 | −52 | −103 | 207 | −416 | 836 |
| 104 | 52 | 104 | −209 | 420 | −844 |
| 105 | −53 | −105 | 211 | −424 | 852 |
| 106 | 53 | 106 | −213 | 428 | −860 |
| 107 | −54 | −107 | 215 | −432 | 868 |
| 108 | 54 | 108 | −217 | 436 | −876 |
| 109 | −55 | −109 | 219 | −440 | 884 |
| 110 | 55 | 110 | −221 | 444 | −892 |
| 111 | −56 | −111 | 223 | −448 | 900 |
| 112 | 56 | 112 | −225 | 452 | −908 |
| 113 | −57 | −113 | 227 | −456 | 916 |
| 114 | 57 | 114 | −229 | 460 | −924 |
| 115 | −58 | −115 | 231 | −464 | 932 |
| 116 | 58 | 116 | −233 | 468 | −940 |
| 117 | −59 | −117 | 235 | −472 | 948 |
| 118 | 59 | 118 | −237 | 476 | −956 |
| 119 | −60 | −119 | 239 | −480 | 964 |
| 120 | 60 | 120 | −241 | 484 | −972 |
| 121 | −61 | −121 | 243 | −488 | 980 |
| 122 | 61 | 122 | −245 | 492 | −988 |
| 123 | −62 | −123 | 247 | −496 | 996 |
| 124 | 62 | 124 | −249 | 500 | −1003 |
| 125 | −63 | −125 | 251 | −503 | 1006 |
| 126 | 63 | 126 | −252 | 503 | −1003 |
| 127 | −63 | −126 | 251 | −500 | 996 |
| 128 | 62 | 125 | −249 | 496 | −988 |
| 129 | −62 | −124 | 247 | −492 | 980 |
| 130 | 61 | 123 | −245 | 488 | −972 |
| 131 | −61 | −122 | 243 | −484 | 964 |
| 132 | 60 | 121 | −241 | 480 | −956 |
| 133 | −60 | −120 | 239 | −476 | 948 |
| 134 | 59 | 119 | −237 | 472 | −940 |
| 135 | −59 | −118 | 235 | −468 | 932 |
| 136 | 58 | 117 | −233 | 464 | −924 |
| 137 | −58 | −116 | 231 | −460 | 916 |
| 138 | 57 | 115 | −229 | 456 | −908 |
| 139 | −57 | −114 | 227 | −452 | 900 |
| 140 | 56 | 113 | −225 | 448 | −892 |
| 141 | −56 | −112 | 223 | −444 | 884 |
| 142 | 55 | 111 | −221 | 440 | −876 |
| 143 | −55 | −110 | 219 | −436 | 868 |
| 144 | 54 | 109 | −217 | 432 | −860 |
| 145 | −54 | −108 | 215 | −428 | 852 |
| 146 | 53 | 107 | −213 | 424 | −844 |
| 147 | −53 | −106 | 211 | −420 | 836 |
| 148 | 52 | 105 | −209 | 416 | −828 |
| 149 | −52 | −104 | 207 | −412 | 820 |

TABLE 1-continued

Frame Numbers; Phases; Phase Differences

| Frame No. | $\phi(m)$ | $\Delta_1(m)$ | $\Delta_2(m)$ | $\Delta_3(m)$ | $\Delta_4(m)$ |
|---|---|---|---|---|---|
| 150 | 51 | 103 | −205 | 408 | −812 |
| 151 | −51 | −102 | 203 | −404 | 804 |
| 152 | 50 | 101 | −201 | 400 | −796 |
| 153 | −50 | −100 | 199 | −396 | 788 |
| 154 | 49 | 99 | −197 | 392 | −780 |
| 155 | −49 | −98 | 195 | −388 | 772 |
| 156 | 48 | 97 | −193 | 384 | −764 |
| 157 | −48 | −96 | 191 | −380 | 756 |
| 158 | 47 | 95 | −189 | 376 | −748 |
| 159 | −47 | −94 | 187 | −372 | 740 |
| 160 | 46 | 93 | −185 | 368 | −732 |
| 161 | −46 | −92 | 183 | −364 | 724 |
| 162 | 45 | 91 | −181 | 360 | −716 |
| 163 | −45 | −90 | 179 | −356 | 708 |
| 164 | 44 | 89 | −177 | 352 | −700 |
| 165 | −44 | −88 | 175 | −348 | 692 |
| 166 | 43 | 87 | −173 | 344 | −684 |
| 167 | −43 | −86 | 171 | −340 | 676 |
| 168 | 42 | 85 | −169 | 336 | −668 |
| 169 | −42 | −84 | 167 | −332 | 660 |
| 170 | 41 | 83 | −165 | 328 | −652 |
| 171 | −41 | −82 | 163 | −324 | 644 |
| 172 | 40 | 81 | −161 | 320 | −636 |
| 173 | −40 | −80 | 159 | −316 | 628 |
| 174 | 39 | 79 | −157 | 312 | −620 |
| 175 | −39 | −78 | 155 | −308 | 612 |
| 176 | 38 | 77 | −153 | 304 | −604 |
| 177 | −38 | −76 | 151 | −300 | 596 |
| 178 | 37 | 75 | −149 | 296 | −588 |
| 179 | −37 | −74 | 147 | −292 | 580 |
| 180 | 36 | 73 | −145 | 288 | −572 |
| 181 | −36 | −72 | 143 | −284 | 564 |
| 182 | 35 | 71 | −141 | 280 | −556 |
| 183 | −35 | −70 | 139 | −276 | 548 |
| 184 | 34 | 69 | −137 | 272 | −540 |
| 185 | −34 | −68 | 135 | −268 | 532 |
| 186 | 33 | 67 | −133 | 264 | −524 |
| 187 | −33 | −66 | 131 | −260 | 516 |
| 188 | 32 | 65 | −129 | 256 | −508 |
| 189 | −32 | −64 | 127 | −252 | 500 |
| 190 | 31 | 63 | −125 | 248 | −492 |
| 191 | −31 | −62 | 123 | −244 | 484 |
| 192 | 30 | 61 | −121 | 240 | −476 |
| 193 | −30 | −60 | 119 | −236 | 468 |
| 194 | 29 | 59 | −117 | 232 | −460 |
| 195 | −29 | −58 | 115 | −228 | 452 |
| 196 | 28 | 57 | −113 | 224 | −444 |
| 197 | −28 | −56 | 111 | −220 | 436 |
| 198 | 27 | 55 | −109 | 216 | −428 |
| 199 | −27 | −54 | 107 | −212 | 420 |
| 200 | 26 | 53 | −105 | 208 | −412 |
| 201 | −26 | −52 | 103 | −204 | 404 |
| 202 | 25 | 51 | −101 | 200 | −396 |
| 203 | −25 | −50 | 99 | −196 | 388 |
| 204 | 24 | 49 | −97 | 192 | −380 |
| 205 | −24 | −48 | 95 | −188 | 372 |
| 206 | 23 | 47 | −93 | 184 | −364 |
| 207 | −23 | −46 | 91 | −180 | 356 |
| 208 | 22 | 45 | −89 | 176 | −348 |
| 209 | −22 | −44 | 87 | −172 | 340 |
| 210 | 21 | 43 | −85 | 168 | −332 |
| 211 | −21 | −42 | 83 | −164 | 324 |
| 212 | 20 | 41 | −81 | 160 | −316 |
| 213 | −20 | −40 | 79 | −156 | 308 |
| 214 | 19 | 39 | −77 | 152 | −300 |
| 215 | −19 | −38 | 75 | −148 | 292 |
| 216 | 18 | 37 | −73 | 144 | −284 |
| 217 | −18 | −36 | 71 | −140 | 276 |
| 218 | 17 | 35 | −69 | 136 | −268 |
| 219 | −17 | −34 | 67 | −132 | 260 |
| 220 | 16 | 33 | −65 | 128 | −252 |
| 221 | −16 | −32 | 63 | −124 | 244 |
| 222 | 15 | 31 | −61 | 120 | −236 |
| 223 | −15 | −30 | 59 | −116 | 228 |
| 224 | 14 | 29 | −57 | 112 | −220 |
| 225 | −14 | −28 | 55 | −108 | 212 |
| 226 | 13 | 27 | −53 | 104 | −204 |
| 227 | −13 | −26 | 51 | −100 | 196 |
| 228 | 12 | 25 | −49 | 96 | −188 |
| 229 | −12 | −24 | 47 | −92 | 180 |
| 230 | 11 | 23 | −45 | 88 | −172 |
| 231 | −11 | −22 | 43 | −84 | 164 |
| 232 | 10 | 21 | −41 | 80 | −156 |
| 233 | −10 | −20 | 39 | −76 | 148 |
| 234 | 9 | 19 | −37 | 72 | −140 |
| 235 | −9 | −18 | 35 | −68 | 132 |
| 236 | 8 | 17 | −33 | 64 | −124 |
| 237 | −8 | −16 | 31 | −60 | 116 |
| 238 | 7 | 15 | −29 | 56 | −108 |
| 239 | −7 | −14 | 27 | −52 | 100 |
| 240 | 6 | 13 | −25 | 48 | −92 |
| 241 | −6 | −12 | 23 | −44 | 84 |
| 242 | 5 | 11 | −21 | 40 | −76 |
| 243 | −5 | −10 | 19 | −36 | 68 |
| 244 | 4 | 9 | −17 | 32 | −60 |
| 245 | −4 | −8 | 15 | −28 | 52 |
| 246 | 3 | 7 | −13 | 24 | −44 |
| 247 | −3 | −6 | 11 | −20 | 36 |
| 248 | 2 | 5 | −9 | 16 | −28 |
| 249 | −2 | −4 | 7 | −12 | 20 |
| 250 | 1 | 3 | −5 | 8 | −12 |
| 251 | −1 | −2 | 3 | −4 | 4 |
| 252 | 0 | 1 | −1 | 0 | 4 |

What is claimed is:

1. A method for determining a number of a frame in a sequence of two or more frames, the method comprising:
receiving a sequence of at least M+1 consecutive OFDM frames, each frame having an index m, having a designated preamble wherein the designated preamble has a selected length N1 and an associated pseudo-noise signal PN(t;m) (m=0, . . . , M; M≧1);
providing an overlap function OF(m;k) of the designated preambles with each of a sequence of selected reference signals, indexed by k=1, 2, . . . , K where K is a selected integer, and determining a phase $\phi(m)$ corresponding to a location of a maximum amplitude of the overlap functions OF(m;k) for each of the M+1 designated preambles of the sequence of at least M+1 consecutive OFDM frames;
forming a selected pth order phase difference of the phases $\phi(m)$; and
comparing the pth order difference with a selected table of pth order phase differences to determine a frame number of at least one frame of M+1 consecutive OFDM frames, the frame number uniquely identifying the at least one frame in the M+1 consecutive OFDM frames.

2. The method of claim 1, further comprising choosing p=1 and choosing said first-order phase difference to be $\Delta_1(m)=\phi(m+1)-\phi(m)$.

3. The method of claim 1, further comprising choosing p=3 and choosing said third-order phase difference to be $\Delta_3(m)=\phi(m+3)-3\phi(m+2)+3\phi(m+1)-\phi(m)$.

4. The method of claim 1, further comprising choosing p to be an odd integer.

5. The method of claim 1, further comprising forming a linear combination $$LC(m)=\sum_{p=1}^{P} c(p)\cdot\Delta_p(m) \quad (P\geq 2)$$

where c(p) are selected coefficients, at least one of which is non-zero; and comparing the linear combination value LC(m) with a selected table of linear combination values to determine a frame number of at least one of the M+1 frames.

6. The method of claim 1, further comprising providing at least two of said pseudo-noise signals, PN(t;m1) and PN(t;m2), as translations of each other through a relation PN(t;m2)=PN(t+Δt(m1,m2)m1), where Δt(m1,m2) is a selected time difference depending upon at least one of said indices m1 and m2.

7. The method of claim 1, further comprising computing a first order sum $\Sigma_1(m=\phi(m+1)+\phi(m)$ for at least one index number m; and when the sum $\Sigma_1(m)$ is not equal to at least one of the numbers +1 and −1, adjusting a value of at least said phases $\phi(m)$ and $\phi(m+1)$ so that the sum $\Sigma 1(m)$ is equal to one of the numbers +1 and −1.

8. The method of claim 1, further comprising choosing at least one of said selected reference signals to be an m-sequence.

* * * * *

UNITED STATES PATENT AND TRADEMARK OFFICE
CERTIFICATE OF CORRECTION

| | |
|---|---|
| PATENT NO. | : 7,324,428 B1 |
| APPLICATION NO. | : 10/040185 |
| DATED | : January 29, 2008 |
| INVENTOR(S) | : Haiyun Yang |

Page 1 of 1

It is certified that error appears in the above-identified patent and that said Letters Patent is hereby corrected as shown below:

Column 9, line 9, claim 6: Cancel "(m1,m2)m1)" and substitute --(m1,m2);m1)--.

Signed and Sealed this

Twenty-fourth Day of June, 2008

JON W. DUDAS
*Director of the United States Patent and Trademark Office*